(12) United States Patent
Bazak et al.

(10) Patent No.: US 9,198,449 B2
(45) Date of Patent: Dec. 1, 2015

(54) PROCESSING OF SUNFLOWER EXTRACTION MEAL

(76) Inventors: Erhard Bazak, Dortmund (DE); Andreas Freiherr von Tautphoeus, Oberhasli (CH)

( * ) Notice: Subject to any disclaimer, the term of this patent is extended or adjusted under 35 U.S.C. 154(b) by 91 days.

(21) Appl. No.: 13/642,674

(22) PCT Filed: Oct. 14, 2010

(86) PCT No.: PCT/EP2010/006278
§ 371 (c)(1),
(2), (4) Date: Oct. 22, 2012

(87) PCT Pub. No.: WO2011/131218
PCT Pub. Date: Oct. 27, 2011

(65) Prior Publication Data
US 2013/0036661 A1   Feb. 14, 2013

(30) Foreign Application Priority Data
Apr. 23, 2010 (DE) .......................... 10 2010 018 220

(51) Int. Cl.
*C10L 5/44* (2006.01)
*A23K 1/14* (2006.01)
(Continued)

(52) U.S. Cl.
CPC .............. *A23K 1/146* (2013.01); *A23K 1/1631* (2013.01); *C10L 5/363* (2013.01); *C10L 5/445* (2013.01); *Y02E 50/10* (2013.01); *Y02E 50/30* (2013.01)

(58) Field of Classification Search
CPC ......... C10L 5/363; C10L 5/445; Y02E 50/30; Y02E 50/10; A23K 1/146; A23K 1/1631

USPC .................................. 44/550–590, 593–598
See application file for complete search history.

(56) References Cited

U.S. PATENT DOCUMENTS 4,314,825 A * 2/1982 Paquette ........................ 44/597
4,692,167 A   9/1987 Levasseur
(Continued)

FOREIGN PATENT DOCUMENTS

EP    0 919 294    6/1999
EP    1 372 409    2/2005
(Continued)

OTHER PUBLICATIONS

International Search Report of PCT/EP2010/006278, date of mailing Jan. 3, 2011.

*Primary Examiner* — Cephia D Toomer
(74) *Attorney, Agent, or Firm* — Collard & Roe, P.C.

(57) ABSTRACT

With a method as well as a system for processing of sunflower extraction grist, particularly for obtaining proteins, wherein the particles from shell kernel parts and adhering proteins of the extraction grist are separated from one another by means of screening, a solution is to be created for processing the extraction grist of sunflowers, which occurs in the production of sunflower oil, in such a manner that it can be utilized in many different ways and, in particular, in practical manner. This is achieved, in terms of method, by means of the following steps:
comminuting the grist by means of breaking it in beater impact mills (3) and/or corrugated rollers (16), screening the mixture of coarse and fine particles produced, separating the plant shells (fibers) and proteins by using water (5, 18), drying (6) the components, and pressing (8) the woody components into pellets as fuel for energy production.

6 Claims, 2 Drawing Sheets

Figure 1:
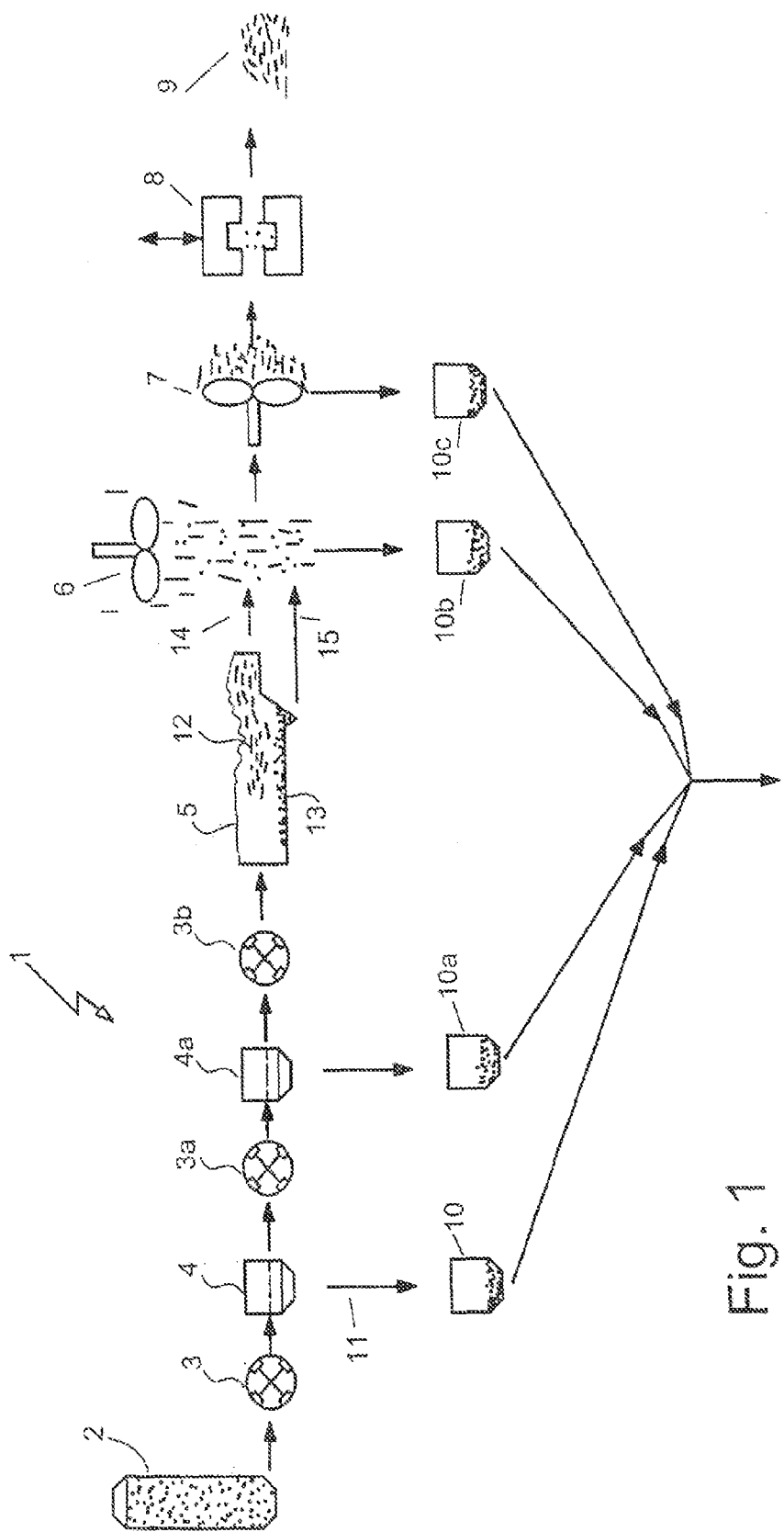

(51) Int. Cl.
*A23K 1/16* (2006.01)
*C10L 5/36* (2006.01)

(56) References Cited

U.S. PATENT DOCUMENTS

2004/0091600 A1 5/2004 Salome et al.
2004/0146628 A1 7/2004 Walter
2008/0171297 A1* 7/2008 Reynolds et al. ............... 432/1
2010/0146850 A1* 6/2010 Bexell ............................ 44/589

FOREIGN PATENT DOCUMENTS

| EP | 1 908 355 | 4/2008 |
| EP | 2 163 159 | 3/2010 |
| FR | 2 577 235 | 8/1986 |
| WO | WO 02/080699 | 10/2002 |

* cited by examiner

PROCESSING OF SUNFLOWER EXTRACTION MEAL

CROSS REFERENCE TO RELATED APPLICATIONS

This application is the National Stage of PCT/EP2010/006278filed on Oct. 14, 2010, which claims priority under 35 U.S.C. §119 of German Application No. 10 2010 018 220.6 filed on Apr. 23, 2010, the disclosure of which is incorporated by reference. The international application under PCT article 21(2) was not published in English.

The invention is directed at a method and a system for processing of sunflower extraction grist, of the type indicated in the preamble of claim 1.

From EP 1 372 409 B, a method and a system for processing of extraction grist from sunflower seeds for animal nutrition are known, whereby there, two fractions of grist components are supposed to be produced by means of comminution and screening steps and separation by means of air separation, whereby one fraction has a higher proportion of raw protein than the other fraction, in order to be able to pass the fractions, in each instance, to different animals as feed or an admixture to feed. In this connection, the fraction with a high raw protein content is supposed to be more suitable for monogastric animals, and the fraction with a lower raw protein content for polygastric animals (ruminants), whose stomachs possess enzymes for splitting cellulose, which is not the case for vertebrates having a one-part stomach.

It has been shown that the method of procedure according to the document that forms the type does not lead to satisfactory results, last but not least as far as the economic utilization of such a separation is concerned.

This is where the invention takes its start, the task of which consists of processing the extraction grist of sunflowers, which occurs in the production of sunflower oil, in such a manner that it can be utilized in many different ways and, in particular, in practical manner.

With a method of the type indicated initially, this task is accomplished, according to the invention, by means of the characterizing characteristics of the main claim.

The results of the separation into fractions that can be utilized very well economically exists, according to the invention, because the proteins on the cellulose fiber material can be obtained better by means of beater impact mills and/or corrugated rollers, which represents an essential point of the invention, as does the separation of the plant shells (fibers) and proteins by means of water separation.

An advantage of the invention consists in achieving a fraction of fine particles that has a high to very high protein content, and another fraction, which has a high to very high cellulose proportion, so that pellets for heating, i.e. for energy production, which are low in pollutants, can be produced from this.

The invention also provides for a system for implementation of the method according to one of the preceding claims, which system is characterized by at least two impact mills and/or corrugated roller grinding units, a water separation system, such as a water separator, drying devices, silos for the extraction grist and the products obtained, as well as corresponding conveying devices between the system elements, and, in an embodiment, by a pellet production, device.

Embodiments of the invention are evident from the dependent claims. In this connection, it can be provided that at least two comminution steps in a beater impact mill and/or corrugated rollers with subsequent screening are used, whereby the invention is not restricted to this number of comminution steps.

With the method of procedure described in the prior art that forms the type, it is not possible to achieve fractions having high protein contents and fractions having lower protein contents, because the proteins still adhere to the cellulose particles to a high degree as the result of this grinding technology.

The invention also provides that the mixture, in each instance, is subjected to an impact period of 5 to 30 seconds. With this method of procedure, it is possible to achieve optimum processing.

In an embodiment, it is provided that separation of the plant shells (fibers) and proteins is undertaken by means of introduction into a water separator or the like, and removal of The floating parts and the parts that settle. Here, good separation is possible, because the protein-rich small particles settle in such a bath, while the cellulose-rich particles float and can therefore be drawn off.

In a further embodiment, it is provided that before introduction of the remaining material into a wetter separator, a water bath, a sprinkling segment, or the like, comminution is undertaken once again in a beater impact mill or corrugated roller.

A modified form of the separation of the proteins from the woody elements consists in that after at least one comminution step and screening step, the remaining coarse components are sprinkled, and after a dwell period that serves for swelling of the proteins, the proteins are separated from the woody components by means of squeeze-screening and/or squeeze-roiling.

According to the invention, a drying step of the fractions produced from plant parts and proteins, and, if necessary, a separation step by means of air separation, can also be provided.

The invention will be explained in greater detail below, as an example, using the drawing. This shows, in FIG. 1 a basic diagram of a system according to the invention, for implementing the method, and in FIG. 2 a modified exemplary embodiment.

The system, indicated in general with 1, is formed, in greatly simplified form, by some system parts, namely, for example, a storage silo 2 for the starting product, some impact mills indicated with 3, screening devices 4, a water separator 5, a drying device 6, an air separator 7 that is indicated, as well as a device 8 for the production of fuel pellets 9.

The protein-rich fractions that are drawn off from the screens, in each instance, are collected, as indicated by silos 10. Here, other collection devices can also be provided. As is evident from the figure, first the extraction grist from the silo 2 is passed to a first impact mill 3, there it is processed for up to 30 seconds, and subsequently applied to a first screening device 4. In this connection, the screen mesh size lies below 500 μm, preferably at 200 to 300 μm. The screened fraction is drawn off (arrow 11) and stored in a first silo 10, in the example shown.

The coarse particles from the first screening 4 are passed to an impact mill 3a once again, and after corresponding treatment, are once again passed to a screening device 4a, whereby the fine product is once again passed to a silo 10a.

Subsequently, the coarse particles are passed to another impact mill 3b. The product produced then is finally applied to a water separator 5. In this connection, the cellulose-rich fraction 12 floats, while the protein-rich fine particles settle to the bottom in the water separator, as indicated with small dots and referenced as 13. Both fractions 12 and 13 are dried, as indicated by a fan 6 in the figures, the floating wet fraction according to arrow 14, the settled wet fraction according to arrow 15, whereby the latter, after drying, once again is passed to an accommodation container 10b.

The dried, floating wet fraction is passed over an air separator 7 once again after leaving the drying device, whereby then, the fine material that forms is collected once again, as shown by a silo 10c indicated in the figures.

After the air separator, a pellet production device, for example a press 8, is still shown, with which fuel pellets 9 can be produced from the dried coarse material, which can then be burned in an energy production system, for example.

The protein-rich, fine product is then passed to further use from the silos 10, for example as a feed admixture for animal feed.

Figure 2:
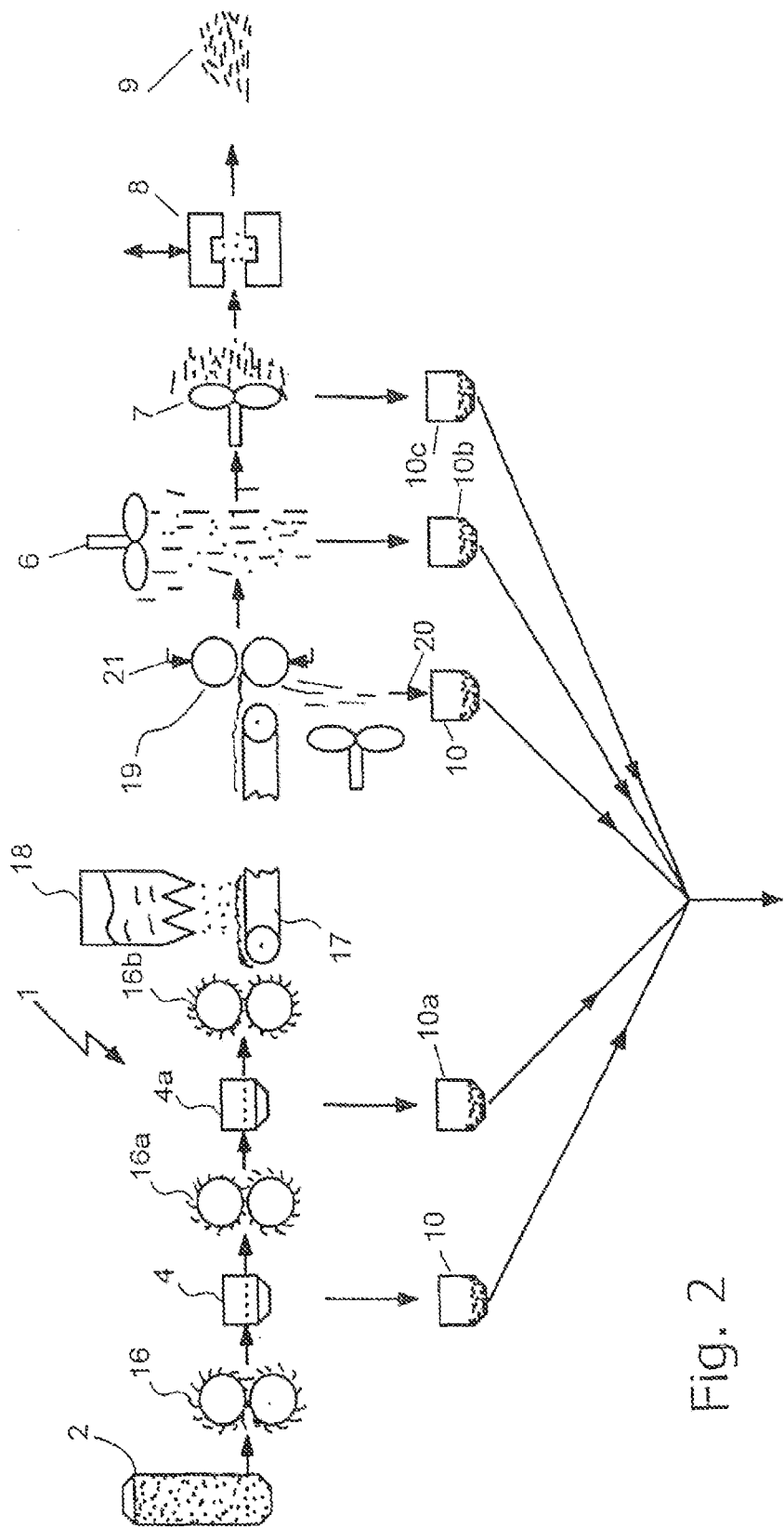

In FIG. 2, a slightly modified exemplary embodiment of the invention is shown, whereby the functionally equivalent elements bear the same reference symbols as in the system according to FIG. 1.

In a modification as compared with the exemplary embodiment according to FIG. 1, here so-called corrugated rollers 16, 16b are provided for beating the grist. After leaving the last roller mill 16b, the broken components are conveyed further by means of a conveyor belt 17, and wetted at the start of the belt, by means of a sprinkling system 18.

It has been shown that the protein components, in particular, swell greatly as the result of wetting, so that they can subsequently be sheared off from the plant fibers by way of a squeezing screen, or, as indicated. In FIG. 2, by way of squeezing rollers 19, and can be deposited in a silo 10 according to arrow 20. The scraping strips of the squeezing rollers are referenced with 21.

The invention is not restricted to the number of treatment steps shown, in each instance. Here, further treatments by means of grinding units or impact mills or corrugated rollers and corresponding silos can also be provided; also, linear guidance of the product streams is not required, here, after screening, returns to the impact mill disposed ahead of this can also be provided, for example, and more of the like.

The invention claimed is:

1. Method for processing of sunflower extraction grist,
wherein the particles from shell kernel parts and adhering proteins of the extraction grist are separated from one another by means of screening,
comprising the following method steps:
comminuting the grist by means of breaking it in a beater impact mill,
screening the mixture of coarse and fine particles produced,
separating woody components and proteins by using water,
drying the woody components, and pressing the woody components into pellets as fuel for energy production, and
by using said beater impact mill,
wherein the mixture, in each instance, is subjected to an impact period of 5 to 30 seconds.

2. Method according to claim 1, comprising
at least two comminution steps in said beater impact mill, with subsequent screening, before the water separation.

3. Method according to claim 1, wherein
separation of woody components and proteins is undertaken by means of introduction into a water separator, and removal of the floating parts and the parts that settle.

4. Method according to claim 1,
wherein
after at least one comminution step and screening step, the remaining coarse components are sprinkled, and, after a dwell period that serves for swelling of the proteins, the proteins are separated from the woody components by means of squeeze-screening and/or squeeze-rolling.

5. Method according to claim 1, comprising
a drying step of the fraction of woody components and proteins produced.

6. Method according to claim 1, comprising
an additional separation step by means of air separation.

* * * * *